United States Patent [19]

Wombles et al.

[11] Patent Number: 4,659,389
[45] Date of Patent: Apr. 21, 1987

[54] METHOD AND COMPOSITION OF ASPHALTIC ROOFING FLUXES

[75] Inventors: Robert H. Wombles, Worthington; Donald D. Carlos, Louisville; Charles R. Gannon, Ashland, all of Ky.

[73] Assignee: Ashland Oil, Inc., Ashland, Ky.

[21] Appl. No.: 758,180

[22] Filed: Jul. 23, 1985

Related U.S. Application Data

[62] Division of Ser. No. 580,968, Feb. 16, 1984, Pat. No. 4,544,411.

[51] Int. Cl.$^4$ .............................................. C08L 95/00
[52] U.S. Cl. ................................. 106/279; 106/273 R
[58] Field of Search ................... 106/273 R, 279, 280; 208/5, 6

[56] References Cited

U.S. PATENT DOCUMENTS

| | | | |
|---|---|---|---|
| 1,782,186 | 11/1930 | Abson | 208/5 |
| 2,287,511 | 6/1942 | Burk et al. | 208/5 |
| 2,370,007 | 2/1945 | Carr | 208/5 |
| 3,440,073 | 4/1969 | Fowler et al. | 106/280 |
| 4,456,523 | 6/1984 | Carlos et al. | 208/22 |

OTHER PUBLICATIONS

Derwent Abstract Accession No. 77-47806y/27, Japanese Patent No. J52063218; May 25, 1977.
Derwent Abstract Accession No. 83-28437k/12, Japanese Patent No. J58023862, Feb. 12, 1983.
Derwent Abstract Accession No. 83-21279k/09, Japanese Patent No. J58011556, Jan. 22, 1983.

Primary Examiner—Amelia B. Yarbrough
Attorney, Agent, or Firm—Richard C. Willson, Jr.; Stanley M. Welsh

[57] ABSTRACT

Preparation of satisfactory asphaltic roofing fluxes from otherwise unsatisfactory fluxes is disclosed to involve addition of asphaltenes, and saturates in quantities which satisfy certain specified conditions. Air oxidation of a flux is shown to be surprisingly accelerated by the addition of highly branched saturates, especially in the presence of a carbonate oxidation catalyst.

4 Claims, 1 Drawing Figure

OXIDATION OF "BUILT UP ROOFING ASPHALT" WITH AND WITHOUT SODIUM CARBONATE

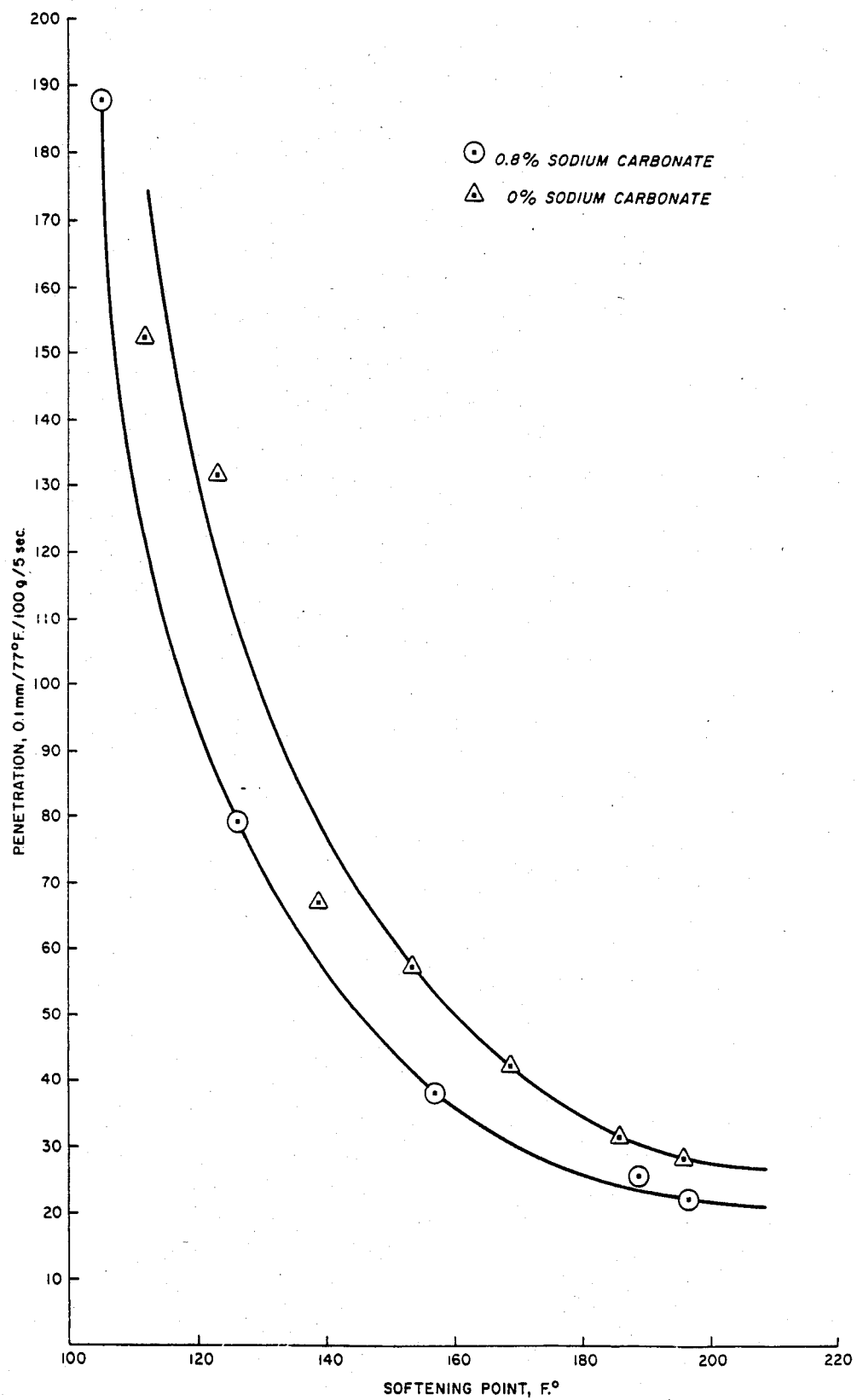
OXIDATION OF "BUILT UP ROOFING ASPHALT"
WITH AND WITHOUT SODIUM CARBONATE

METHOD AND COMPOSITION OF ASPHALTIC ROOFING FLUXES

This application is a division of application Ser. No. 580,968, filed Feb. 16, 1984, now U.S. Pat. No. 4,544,411.

BACKGROUND OF THE INVENTION

(1) Field of the Invention

This invention relates to processing asphaltic compositions arising from tar sands and petroleum sources. More particularly, this invention involves processing asphalt compositions by means of air oxidation to produce useful materials suitable for industrial asphalt applications. By "industrial asphalt applications" is meant applications in which asphalt is used to produce protective or waterproofing coatings or sealers such as canal, ditch and pond linings; asphalt coated pipe; asphalt impregnated and coated building board; and most importantly, the production of roofing materials.

(2) Prior Art

The production of oxidized asphalt by blowing air through petroleum residue or straight run asphalt at elevated temperatures is well known in the art of petroleum refining. Such a procedure has a decided effect upon the physical properties of asphalt. In general, this technique serves to increase the hardness, softening point, pliability and weathering resistance of an asphalt and decreases its ductility and susceptibility to changes with temperature. Oxidized asphalts show better pliability than straight reduced products, when both are of equal hardness. It is to be noted that the hardness of the straight run asphalt may be greatly increased by extensive steam or vacuum distillation of the asphalt, but the resulting product is more susceptible to temperature than an air-blown asphalt.

The air-blowing technique, in comparison with the vacuum distillation method, is capable of producing an asphaltic product of greater pliability but of the same hardness as the asphaltic product produced by vacuum distillation of the same straight run asphalt. As a result of their very desirable hardness, pliability and weathering resistance qualities, oxidized asphalts have become popular in the production of roofing asphalts, protective coatings, electrical insulating compositions, molded articles, and the like.

Air-blowing in the presence of certain catalysts has been found to increase the rate at which the improved asphaltic properties can be achieved, and in some cases, modified the resulting product to have better properties than could otherwise be achieved by air-blowing without such catalysts.

It is well known that asphaltic compositions can be air blown to higher softening points; however, in doing so the needle penetration may be lowered below an acceptable value for some applications.

In U.S. Pat. No. 4,000,000 (1976), there is disclosed a process for recycling asphalt-aggregate compositions by heating and mixing with a desired amount of petroleum hydrocarbons having at least 55% aromatics.

In U.S. Pat. No. 2,287,511 (1938), there is disclosed an asphalt manufacturing process which involves heating a residuum in the presence of the following catalysts: ferric chloride, aluminum bromide, aluminum chloride, aluminum iodide; halides of copper, tin, zinc, antimony, arsenic, boron, titanium; hydroxides of sodium and potassium; calcium oxides, sodium carbonate, and metallic sodium. The catalysts are present in the asphalt composition in the absence of any injected air. There may be an air injection prior to the addition of the above-cited polymerizing catalysts but no air is injected when the catalysts have been added to the composition. That no air is added when the catalysts are present is clear from claim 3 of the U.S. Pat. No. 2,287,511 where it claims a process for making asphalt which involves a petroleum residuum in the absence of an added catalyst and then, in the absence of injected air, thickening the material to asphalt-consistency by heating with temperature rise in the presence of small amounts of an aluminum chloride catalyst.

In U.S. Pat. No. 2,370,007 (1943), there is disclosed a process for oxidizing asphalt involving air blowing a petroleum oil in the presence of a relatively small amount of certain types of catalysts. These catalysts involve an organic complex of a metallic salt. Examples of organic complexes of metallic salts may be obtained from sludges obtained in treating petroleum fractions with metallic salts such as metallic halides, carbonates and sulfates. The sludge obtained in treating a cracked gasoline with aluminum chloride was disclosed to be particularly suitable in accelerating the oxidation reaction and in producing an asphalt of superior characteristics. Also, hydrocarbon stocks from which the organic complex of metallic salts may be produced, were disclosed to include various hydrocarbon fractions containing hydrocarbons which are reactive with the metallic salts in particularly containing olefinic hydrocarbons. Sludges obtained by treating olefins with aluminum chloride were disclosed to be useful for the inventive process disclosed. Other sludges that were indicated to be particularly useful were obtained in the isomerization of hydrocarbons such as butane, pentane and naphtha in the presence of aluminum chloride. Sludges are obtained in the alkylation of isoparaffins with olefins in the presence of such alkylating catalysts as boron trifluoride and the like.

The summary of the metallic halides found to be particularly suitable to treat hydrocarbons to produce organic complexes of the metal salts for U.S. Pat. No. 2,370,007 are as follows: halides of aluminum, zinc, iron, boron, tin, copper and antimony with aluminum chloride being particularly preferred.

In U.S. Pat. No. 2,906,687 (1959), there is disclosed an improvement over conventional methods of air-blowing petroleum asphalts such as those employing modifiers for air blown asphalts which include ferric chloride, zinc chloride and particularly phosphorous compounds such as phosphorous pentoxide and stable phosphorous sulfides. The improvement involves using the reaction product of certain oxygenated organic compounds with conventional asphalt oxidation catalysts, in particular phosphorous pentoxide.

In U.S. Pat. No. 3,126,329 (1964), there is disclosed a blow bitumen which involves a residual petroleum fraction contacted with oxygen in the presence of an anhydrous solution of phosphorus pentoxide and phosphoric acid.

In U.S. Pat. No. 3,440,073 (1969), there is disclosed a purification process for asphaltic material wherein objectionable colors and odors are reduced by steam treating and adding water soluble inorganic alkali materials such as sodium hydroxide, sodium carbonate and potassium hydroxide. The water solutions of the water-soluble inorganic alkaline materials suitable for use in the disclosed invention have a pH of at least 8. Among the materials that would give rise to such solutions by way of an example include alkali metal, and alkaline earth metal compounds, notably their hydroxides carbonates and borates. The improved low level odor asphaltic products of the present invention were produced by incorporating into the hot asphaltic materials, preferably during the air-blowing, a water-soluble inorganic alkaline material in the form of a water solution.

In U.S. Pat. No. 2,421,421 (1944), there is disclosed a process for improving the activity of chlorides of certain metals such as zinc, iron, copper and antimony to increase the penetration and reduce the time of blowing an asphalt, pitch or a mineral lubricating oil. It was disclosed that the activity of halide salt catalysts were enhanced by the addition of a small portion of certain metallic powders, preferably in a very fine state of subdivision. Examples of some of the metals disclosed are aluminum, magnesium, copper, zinc, tin, iron, molybdenum, manganese and antimony.

In U.S. Pat. No. 2,317,150 (1943), there is disclosed a composition comprising a blend of an oxidized precipitated asphalt having a high asphaltene content of 45% to 65% plus a suitable flux capable of forming a complete and stable dispersion. Such fluxes usually contain a high aromatic content. An example of the suitable flux would be a mixture of heavy extract and a lubricating oil distillate. Precipitated asphalts are disclosed to be obtained in general from asphaltic crudes that have been freed of their lightest components by distillation.

In U.S. Pat. No. 2,276,155 (1939), there is disclosed a process comprising separating an asphalt fraction into components comprising asphaltenes, resins and an oil, and subsequently blending the oil with the asphaltenes in desirable proportions to yield a feedstock to be air-blown into a finished product. The term "asphaltenes" is defined to be those components of topped residuum which are insoluble in propane and insoluble in petroleum ether. The term "resins" includes those constituents of topped residuum which are insoluble in propane but soluble in petroleum ether. The term "oil" comprises those components present in topped residuum which are soluble in both propane and petroleum ether.

In U.S. Pat. No. 1,782,186 (1929), there is disclosed that air oxidation of asphaltic materials is changed and accelerated to a remarkable degree by the addition of small quantities of chlorides, sulfates or carbonates of zinc, iron, copper or antimony to the asphaltic material prior to air-blowing.

In U.S. Pat. No. 2,179,208 (1939), there is disclosed an improved process for manufacturing asphalts which comprises the steps of air-blowing a petroleum residuum in the absence of any added catalysts while maintaining the temperature at about 149° to 260° C. (300° to 500° F.) and then heating the material at a temperature at least about 149° C. (300° F.) with a small amount of a polymerizing catalyst. Examples of such polymerizing catalysts include chlorosulphonic, phosphoric, fluoroboric, hydrochloric, nitric or sulfuric acids and halides as ferric chloride, aluminum bromide, chloride, iodide, halides similarly of copper, tin, zinc, antimony, arsenic, titanium, etc. hydroxides of sodium, potassium, calcium oxides, sodium carbonate, metallic sodium, nitrogen bases, ozonides and peroxides. Blowing of air may be continued in the presence of the polymerizing catalysts.

In U.S. Pat. No. 4,202,755 (1980), there is disclosed a process for making pitch from petroleum bottom fractions by air-blowing in the presence of metallic sodium. Potassium metal is also expected to catalyze the same reactions as sodium but is disclosed to be so much more reactive as to be far less desirable.

In U.S. Pat. No. 3,607,334 (1971), there is disclosed an asphaltic composition comprising as a major amount of asphalt and a minor amount of a second pass foots oil derived from heavy lube distillate. The second pass foots oil is derived from deoiling slack wax removed from heavy lube oil distillates in the manufacture of high viscosity distillate lubricating oils. The foots oil comprises, in general, about 55 to 65 wt% in paraffins, about 0 to 4 wt% isoparaffins, about 30 to 45 wt% naphthenes and about 1% aromatics. The compositions described above can be used as a felt saturant and also as a starting material in the air-blowing process for making roofing material.

In U.S. Pat. No. 4,052,290 (1977), there is disclosed an improved asphalt composition made from a blend of marginal asphalt stock and coal-derived asphaltenes. The blended composition is then air-blown to a final product. Conventional air-blowing conditions are asserted to be described in U.S. Pat. Nos. 2,767,102; 3,462,359; and 3,707,388. In a typical air-blowing procedure, an air rate of about 1.2 to 3.5 cubic feet per hour per pound of charge is employed under atmospheric pressure at a temperature in the range of between about 204° C. (400° F.) to about 427° C. (800° F.).

Efforts to understand the detailed chemistry behind air-oxidation of asphaltic compositions or fluxes to produce useful asphaltic materials has been almost totally frustrated by the complexity of the various molecular species present. The difficulties are further compounded by the varieties of crude sources from which asphaltic fluxes can be derived.

To properly understand the discussion of the instant invention, the following definitions are useful:

An "asphaltic flux" or "flux" throughout this Specification and claims means a low viscosity asphaltic material which is used as the oxidizer charge. The flux is produced by blending various residual streams with other streams of high boiling point to produce a flux of the desired consistency and composition.

An asphaltic flux for purposes of this invention is intended to mean a composition comprising at least four components. These four components are "asphaltenes", "polar", "aromatics", and "saturates", each of which is defined for purposes of this invention to be fractions isolatable in accordance with procedures set out in detail in EXAMPLE ONE. These fractions are similar to but not identical to some of those discussed in U.S. Pat. No. 2,276,155 (1939).

"Slack wax" for purposes of this invention is a product produced during the refining of lubricating oils. A material called a waxy distillate is distilled from a crude oil and extracted with furfural to remove aromatic compounds. After the furfural extraction, the raffinate from that extraction is treated with toluene and methyl ethyl ketone. The raffinate, toluene, and methyl ethyl ketone mixture is cooled causing a wax to crystallize. That wax isolated by filtration is called "slack wax". Other methods for "slack wax" production are known, but the above is simply an example. Some literature references to the production of slack wax are Petroleum Products Handbook; Virgil R. Guthrie, Editor; First Edition; McGraw-Hill Book Company, Inc.; 1960; Section 1, Page 26.

"Deasphalted oil" for purposes of this invention is derived in refinery operations from the overhead product of solvent deasphalting of a vacuum resid. Some literature references to the production of deasphalted oils are Petroleum Products Handbook; Virgil R. Guthrie, Editor; First Edition, McGraw-Hill Book Company, Inc.; 1960 Section 1, Page 23. Asphalt Its Composition, Properties, and Uses; Ralph N. Traxler; Reinhold Publishing Corporation; 1961 Chapter 7 Pages 129-130. Deasphalted oils are a mixture of "aromatics", "saturates" and a small amount of "polars".

"Petrolatum" for purposes of this invention means the waxy material produced as a by-product of bright stock production. Bright stock is a high visiosity lubricating oil. Petrolatum is simply the slack wax of bright stock production. Examples of methods for producing petrolatums can be found in Petroleum Products Handbook; Virgil R. Guthrie, Editor; First Edition; McGraw-Hill Book Company, Inc; 1960; Section 1, Page 26.

"Hydrocarbyl species" for purposes of this invention comprise at least about 20 carbon atoms, and more preferably at least about 30 carbon atoms, and still more preferably at least about 40 carbon atoms. "Hydrocarbyl" means throughout this Specification and claims a material consisting essentially of carbon and hydrogen with less than 10% by weight of carbon atoms involved in unsaturation, i.e., multiple bonds between carbon atoms. Preferably, the hydrocarbyl species is highly branched as opposed to being primarily linear. By "highly branched" is meant that there is at least 10% by weight, as based upon the total weight of the hydrocarbyl species, of tertiary carbon atoms, i.e. carbon atoms having at least three other carbon atoms attached to it. The only limitation on the number of carbon atoms in the hydrocarbyl species is sufficient boiling point and solubility. If there are too few carbon atoms then the hydrocarbyl species will be too volatile and will be distilled from the oxidizer during the oxidation process and if there are too many, then the hydrocarbyl species will be of too high a molecular weight and insoluble in the asphaltic material.

The presence of other atoms other than carbon and hydrogen does not change the usefulness of a hydrocarbyl species, provided these other atoms are present at less than about 10% by weight, as based upon the total weight of the hydrocarbyl species, preferably less than about 5% by weight, and still more preferably less than about 2% by weight. Examples of such other atoms include halogens, (e.g. fluorine, chloride, bromine amd iodine), sulfur, oxygen, nitrogen or mixtures thereof. Halogens, because of their corrosiveness, are preferably avoided.

Hydrocarbyl species include polymers such as polyethylene, polypropylene, polyisobutylene, polystyrene, polyesters, polyamines, and polyamides. Polyisobutylene has been found to work especially well.

"Cylinder stock" for purposes of this invention is a stream from a vacuum tower which is a cut above vacuum bottoms of a crude feedstock. Cylinder stock is obtained by the vacuum distillation of reduced crude. Cyclinder stock has a boiling point of 454° C. to 560° C. (850° F. to 1040° F.). Cylinder stock is separated by distillation under a pressure in the range of about 10 to 150 mm (millimeters of Hg) at a temperature usually in the range of from about 357° C. to 399° C. (675° F. to 750° F.). Use of cylinder stock as a blending component to marginal fluxes which are then upgraded by air oxidation to roofing asphalts is well known.

In the prior art, cylinder stock was used merely as a viscosity adjuster. There is no teaching or suggestion, how to use cylinder stock to transform an unsatisfactory flux to a useful roofing flux composition other than by trial and error, if at all.

"Satisfactory asphaltic roofing compositions" or "satisfactory roofing fluxes" for purposes of this invention are oxidizer charges or fluxes which upon air-oxidation in accordance with methods described with respect to examples in this Specification yield a material or asphalt suitable for use in (1) waterproof membrane construction, (2) dampproofing and waterproofing, (3) roofing applications, or (4) shingle coating.

With virtual invariability, if a flux can be air-oxidized with or without a catalyst to produce an asphalt suitable for use as a shingle coating, then that flux can be air-oxidized to an asphalt suitable for any of the other applications (1-3) cited above.

The following tables set out in detail the specification requirements that establish suitability for applications (1)-(4). In some applications, there are subclasses or types that fall within a board category, such as in roofing applications which can involve four subclasses or types.

| (1) Waterproof Membrane Construction | | |
| --- | --- | --- |
| Property | Minimum | Maximum |
| Softening Point, °C. (°F.) | 79 (175) | 93 (200) |
| Pen 25° C. (77° F.)/100 g/5 sec; 0.1 mm | 50 | 60 |
| Pen 0° C. (32° F.)/200 g/60 sec; 0.1 mm | 30 | — |
| Pen 46° C. (115° F.)/50 g/5 sec; 0.1 mm | — | 120 |
| Ductility, 25° C. (77° F.), cm | 35 | 13 |
| Flash, COC, °F. | 218 (425) | — |
| Sol. in Trichloroethylene, wt. % | 97.0 | — |
| Loss on Heating, wt. % | — | 1.0 |
| Penetration after loss on heating, % of original 25° C. (77° F.)/100 g/5 sec; 0.1 mm | 60 | — |

| | (2) Dampproofing and Waterproofing | | | | | |
| --- | --- | --- | --- | --- | --- | --- |
| | Type I | | Type II | | Type III | |
| Property | Minimum | Maximum | Minimum | Maximum | Minimum | Maximum |
| Softening Point, °C. (°F.) | 46 (115) | 60 (140) | 63 (145) | 77 (170) | 82 (180) | 93 (200) |
| Flash, COC, °F. | 175 (347) | — — | 200 (392) | — — | 205 (401) | — — |
| Penetration | | | | | | |
| 0° C. (32° F.)/200 g/60 sec, 0.1 mm | 5 | — | 10 | — | 10 | — |
| 25° C. (77° F.)/200 g/5 sec, 0.1 mm | 50 | 100 | 25 | 50 | 20 | 40 |
| 46° C. (115° F.)/50 g/5 sec, 0.1 mm | 100 | — | — | 130 | — | 100 |
| Ductility, 25° C. (77° F.), cm | 30 | — | 10 | — | 2 | — |
| Solubility in Trichoroethylene, wt. % | 99 | — | 99 | — | 99 | — |

| Asphalt in Roofing | | | |
| --- | --- | --- | --- |
| Type I | Type II | Type III | Type IV |

-continued

| Property | Minimum | Maximum | Minimum | Maximum | Minimum | Maximum | Minimum | Maximum |
| --- | --- | --- | --- | --- | --- | --- | --- | --- |
| Softening Point, °C. (°F.) | 57 (135) | 66 (151) | 70 (158) | 80 (176) | 85 (185) | 96 (205) | 99 (210) | 107 (225) |
| Flash, COC, °C. (°F.) | 225 (437) | — | 225 (437) | — | 225 (437) | — | 225 (437) | — |
| Penetration | | | | | | | | |
| 0° C. (32° F.)/200 g/60 sec, 0.1 mm | 3 | — | 6 | — | 6 | — | 6 | — |
| 25° C. (77° F.)/100 g/5 sec, 0.1 mm | 18 | 60 | 18 | 40 | 15 | 35 | 12 | 25 |
| 46° C. (115° F.)/50 g/5 sec, 0.1 mm | 90 | 180 | — | 100 | — | 90 | — | 75 |
| Ductility, 25°C. (77° F.), cm | 10.0 | — | 3.0 | — | 2.5 | — | 1.5 | — |
| Solubility in Trichloroethylene, wt. % | 99 | — | 99 | — | 99 | — | 99 | — |

| | Shingle Coating - Different Specs by Each Company; This is Only An Average | |
| --- | --- | --- |
| | Minimum | Maximum |
| Softening Point, °C. (°F.) | 104 (220) | 113 (235) |
| Flash, COC, °C. (°F.) | 225 (437) | — |
| Penetration | | |
| 25° C. (77° F.)/100 g/5 sec, 0.1 mm | 17 | 23 |
| Solubility in Trichloroethylene, wt. % | 99 | — |

"Air oxidation without catalysts" for purposes of this invention means the bubbling of an oxidizing gas, usually air, through an asphaltic flux at an elevated temperature of 149° C. to 427° C. (300° F. to 800° F.) in the absence of an oxidation catalyst. The oxidation causes the flux to increase in consistency thus yielding a finished asphaltic material with a fairly high softening point.

"Air oxidation with catalysts" for purposes of this invention means the bubbling of an oxidizing gas, usually air, through an asphaltic flux at an elevated temperature of 149° C. to 427° C. (300° F. to 800° F.) in the presence of an oxidation catalyst. The presence of the oxidation catalyst alters the course of the oxidation and yields a product with different properties than would have been obtained without the catalyst in usually a shorter amount of time. Examples of catalysts found to yield preferred results are materials which contain carbonate or sesquicarbonate or mixtures thereof, e.g. alkaline earth carbonates and sesquicarbonates. However, other well known prior art catalysts for accelerating air oxidation of asphaltic roofing fluxes usually will also work. Examples of such other catalysts are ferric chloride and phosphorus pentoxide. The principal requirement for such oxidation catalysts is dispersibility throughout a flux.

"Compounding" for purposes of this invention means any method which can be used to mix various asphaltic flux blending streams to obtain a homogeneous blend. The compounding will almost always be done while the streams are in the liquid state and will usually involve some form of mixing although any method which will yield a homogeneous blend is acceptable.

An "unacceptable asphaltic roofing flux" comprising asphaltenes, polars, aromatics and saturates (as hereinabove defined) is one which after air oxidation with or without catalysts fails to achieve those properties required of "satisfactory asphaltic roofing composition" or "satisfactory roofing flux".

BRIEF DESCRIPTION OF THE INVENTION

The only FIGURE in this case relates to EXAMPLE 6 disclosing penetration [25° C. (77° F.)/100 g/5 sec, 0.1 mm] as a function of softening point, °F.

Broadly, it is an object of this invention to provide a method for transforming an unsatisfactory roofing flux into an asphaltic roofing composition or a roofing flux, as hereinabove defined.

Broadly, it is an object of this invention to provide a precise method for determining the proper amounts of selected materials to be added to an unaccepable roofing flux to make it suitable as a roofing flux.

In some embodiments of this invention, it is an object to provide a novel use for waste plastics in asphaltic flux compositions.

In some embodiments of this invention, it is an object to minimize or totally avoid the use of any catalysts to accelerate or assist in air oxidation.

Other objects of this invention will be clear from the Specification.

Broadly, this invention discloses a method for producing a satisfactory flux (a) which comprises four components, i.e. asphaltenes, aromatics, polars, and saturates, and (b) which upon air oxidation turns into a material with useful properties. Such useful properties involve penetration, softening point and ductility.

One method for producing such a suitable flux involves adding a sufficient quantity of asphaltenes, if any are required, to produce a "stable dispersion". Usually, if there is at least 10% by weight of asphaltenes, as based upon the total weight of the composition, then that composition is stable. Preferably, after addition of asphaltenes, there is anywhere from about 10% to about 20% by weight of asphaltenes, as based upon the total weight of the fully compounded flux, and still more preferably about 12 to about 15% by weight. A "stable dispersion" for purposes of this invention means a resultant asphaltic blend which on standing at 149° C. (300° F.) for at least one (1) month and preferably at least two (2) months does not separate into a liquid and solid phase; wherein the solid phase is greater than 5% by weight of the total composition. If there are too much asphaltene components added to the composition, then the asphaltic composition becomes more and more unstable as more and more asphaltenes are added. Asphalt is a very delicate dispersion of mutually insoluble molecules in which each asphalt component is dispersed and held in suspension by components of similar aromaticity and polarity. During the compounding process care must be taken not to upset this delicate balance.

Contemplated by this invention is the addition of a sufficient quantity of selected additives so that the asphaltenes, polars and saturates in the completely compounded flux satisfies the following ratio:

(A+P)/(S)<2.4, and preferably, <2.3 and still more preferably <2.2;

wherein:

"A" is weight of asphaltenes in the flux; "P" is weight of polars in the flux; "S" is weight of saturates in the flux; and "<" means less than or equal to.

Examples of suitable additives include deasphalted oils, petrolatums, cylinder stocks, hydrocarbyl species, slack waxes and mixtures thereof.

Examples of "saturates" include a material selected from the group consisting of: slack wax, petrolatums, hydrocarbyl species and mixtures thereof.

Cylinder stocks and deasphalted oils can also be used, however, for optimum and preferred results, one must determine the amount of asphaltenes, polars, and saturates or their equivalents (as defined in accordance with the instant invention) which are present in a particular cylinder stock or deasphalted oil to be used as additive and in the initially unsatisfactory flux. Once these various components of the initial unsatisfactory flux and cylinder stock or deasphalted oil have been determined, the amount of cylinder stock or deasphalted oil, respectively, to be added in order to obtain a composition which satisfies the following equation: (asphaltenes plus polars)/saturates<about 2.4, preferably<about 2.3 and still more preferably<about 2.2.

EXAMPLE ONE

This example sets forth the method for isolating the four fractions defined for purposes of this Specification and claims to correspond to asphaltenes, polars, aromatics, and saturates.

Other methods or procedures can be defined to give equivalent or substantially identical results to the particular methods disclosed in this example. It is therefore to be understood that once the goal of the methods disclosed in this example have been disclosed other procedures can be defined which can give similar if not identical results without departing either from the spirit or intent of this invention.

The method preferably used to determine the asphaltene, polar, aromatic and saturate content of the roofing fluxes is the clay-gel adsorption chromatographic method of ASTM D-2007.

The following is a description of that method:

The first step of the clay-gel analysis is the dissolving of the sample to be analyzed into 40 milliters of pentane for each gram of the sample. The pentane insoluble fraction of the asphalt which is removed by filtration is called the "asphaltenes". The pentane soluble part of the asphalt, which is called the "maltenes" is eluted through a separable colinear two part column apparatus in which the top column is packed with attapulgus clay and the bottom column is packed with silica gel and attapulgus clay. The two columns are eluted with pentane until 250 ml of pentane eluent has been collected. At this time, the elution of the columns with pentane is stopped, the pentane is evaporated and the residual material obtained is designated as the saturates.

The next step in the clay-gel analysis is to separate the two part column. The attapulgus clay (top) column is eluted with a 50:50 (by volume) mixture of benzene and acetone. The elution is continued until the benzene and acetone mixture emerging from the end of the column is colorless. At this time, the elution is stopped, the benzene-acetone mixture collected is evaporated and the residual material is designated as polars.

At this point the asphaltenes, saturates and polars have been determined directly so the aromatics are determined by difference to complete the clay-gel analysis.

Other methods which will give results similar to the clay-gel analysis are liquid chromatographic methods such as the Corbett analysis, ASTM D-4124, and many high performance liquid chromatographic methods.

EXAMPLE TWO

This example shows that, for a vast majority of crudes, if the condition (asphaltenes plus polars)/saturates is less than or equal to about ("<") 2.4 then a satisfactory roofing flux results. If the initial material does not satisfy the above condition, then the condition may be satisfied by adding an additive selected from the group consisting of: deasphalted oils, petrolatums, hydrocarbyl species, and slack waxes. A useful roofing flux will thereby be formed.

In the following examples the same oxidation procedure was used to oxidize the asphalt flux. 500 g of the flux to be oxidized is added to a small asphalt oxidizer. The flux at atmospheric pressure, is brought to a temperature of 249° C. (480° F.) at which time air is introduced at the rate of 1.0 (SCFH). During the oxidation the temperature is maintained at 249° C. (480° F.). In instances where catalytic oxidation was employed, sodium carbonate was introduced into the oxidizer in a water solution. After the oxidizer has reached 249° C. (480° F.) and the introduction of air has begun, the oxidizer was sampled periodically and each sample was tested for penetration and softening point. The oxidation was continued until the desired penetration was reached. The softening point was determined according to ASTM D-2398 and the penetration was determined according to ASTM D-5.

The sources of the crudes from which the fluxes have been made represent a wide geographical sampling. There are four Middle-Eastern crudes: Arabian Light, Kirkuk, Gulf of Suez Mix, and Iranian Light. There are four domestics: Sub-Clarksville, Montana Mix, Western Kentucky (Westken Heavy Oil) and Alaskan. There are three South American: Ecuadoran Oriente, Lago Medio and Lago Cinco. There is one North Sea Crude which is Forties. Finally, there are two Africans: Upper Zakum and Nigerian Akan.

Of all of the samples, only one did not fit into a defined pattern. The one exception to the pattern was Montana Mix. Montana Mix is an unusual crude source and is so recognized by anyone who has ever handled Montana Mix as compared to any of the other crudes. For example, Montana Mix tends to be very, very viscous.

Of the 17 samples from around the world, only one, Montana Mix, did not fit the pattern. This leads us to estimate statistically that the pattern applies to well over 95% of all crudes.

The Montana Mix being the only exception with a ratio of (polars plus asphaltenes) to saturates <3.0, and preferably, <2.9 and still more preferably, <2.8 will yield an acceptable asphaltic roofing flux.

| | Acceptable Roofing Fluxes |
|---|---|
| Crude Name | Asphaltenes and Polars / Saturates |

-continued

| | |
|---|---|
| Arabian Light | 2.09 |
| Sub-Clarksville | 1.66 |
| Ecuadoran Oriente | 1.85 |
| Westken Heavy Oil (Tar Sand) | 1.58 |
| Kirkuk | 2.22 |
| Lago Medio | 2.05 |
| Lago Cinco | 2.04 |
| Montana Mix | *2.93 |

Unacceptable Roofing Fluxes

| Crude Name | Ratio (Asphaltenes and Polars) Saturates |
|---|---|
| Upper Zakum | 3.35 |
| Gulf Suez Mix | 2.40 |
| Mixed Domestic | 5.45 |
| Alaskan | 3.09 |

Unacceptable Roofing Fluxes with Correct Ratio But Less Than 10% Asphaltenes

| Crude Name | Ratio (Asphaltenes and Polars)/ Saturates | Asphaltenes Content |
|---|---|---|
| Forties | 1.83 | 7.3 |
| Akan (Nigeria) | 2.34 | 0.8 |
| Akan (Nigeria) | 1.87 | 1.7 |
| Iranian Light | 1.93 | 8.7 |
| Iranian Light | 2.30 | 9.7 |

The purpose of the next part of this example is to demonstrate that an unacceptable roofing flux with an (asphaltenes plus polar) to saturate ratio of greater then 2.3 can have that ratio adjusted to less than 2.3 and thereby be made into an acceptable roofing flux.

The unacceptable Mixed Domestic flux from above was analyzed by clay-gel analysis and determined to have the following composition:

| | |
|---|---|
| Asphaltenes, wt. % - | 22.3 |
| Saturates, wt. % - | 11.7 |
| Polars, wt. % - | 41.5 |
| Aromatics, wt. % - | 24.5 |

$$\frac{(Asphaltenes + Polars)}{Saturates} = 5.45$$

The flux was oxidized without catalysts using the procedure described above and yielded a finished product after 18 hours having a penetration of 15 and a softening point of 83° C. (181° F.). This oxidized material fails to meet shingle coating specifications (see infra).

A final flux was produced by blending 85% by weight based upon total weight of the final flux of the above flux with 15% by weight (on the same basis) of petrolatum to produce a roofing flux with the following composition:

| | |
|---|---|
| Asphaltenes, wt. % - | 19.0 |
| Saturates, wt. % - | 24.9 |
| Polars, wt. % - | 35.3 |
| Aromatics, wt. % - | 20.8 |

$$\frac{Asphaltenes + Polars}{Saturates} = 2.18$$

Note that petrolatum is 100% saturate. The flux was oxidized using the same procedure as the unsatisfactory flux and it yielded a finished product after 12 hours having a penetration of 21 and a softening point of 108° C. (227° F.). This oxidized material meets shingle coating specifications (see infra).

SAMPLE THREE

This example shows in more precise detail how cylinder stock can be compounded with an unsatisfactory flux to make a satisfactory flux. Since a cylinder stock itself consists of asphaltenes, polars, aromatics, and saturates and since cylinder stock varies depending upon crude source and method of manufacture, to determine the amount of cylinder stock needed to form a composition which satisfies the condition set forth in EXAMPLE TWO requires a determination of the cylinder stock by any method which yields an analysis which is consistent with the procedures set forth in EXAMPLE ONE.

The final flux must satisfy the following: wherein ((initial asphaltenes plus (asphaltenes from cylinder stock) plus initial polars plus (polars from cylinder stock))/(initial saturates plus (saturates from cylinder stock)) is less than or equal to ("<") 2.3.

A roofing flux obtained from Alaskan crude was analyzed by clay-gel analysis and determined to have the following composition:

| | |
|---|---|
| Asphaltenes, wt. % - | 13.6 |
| Saturates, wt. % - | 19.0 |
| Polars, wt. % - | 45.2 |
| Aromatics, wt. % - | 22.2 |

$$\frac{Asphaltenes + Polars}{Saturates} = 3.09$$

The flux was oxidized using the described procedure and yielded a finish product having a penetration of 12 and a softening point of 88° C. (190° F.). This oxidized material fails to meet shingle coating specifications.

A cyclinder stock to be used as a blending component with the Alaskan flux was analyzed by clay-gel and found to have the following composition:

| | |
|---|---|
| Asphaltenes, wt. % - | 1.5 |
| Saturates, wt. % - | 48.7 |
| Polars, wt. % - | 21.2 |
| Aromatics, wt. % - | 28.6 |

$$\frac{Asphaltenes + Polars}{Saturates} = 0.47$$

It was determined from the above compositions that a blend of 80% by weight Alaskan flux and 20% by weight cylinder stock would yield a roofing flux with an asphaltenes plus polars to saturates ratio of less than 2.3. The blend was made and analyzed by clay gel analysis to obtain the following composition:

| | |
|---|---|
| Asphaltenes, wt. % - | 11.2 |
| Saturates, wt. % - | 24.9 |
| Polars, wt. % - | 40.4 |
| Aromatics, wt. % - | 23.5 |

$$\frac{Asphaltenes + Polars}{Saturates} = 2.07$$

The blended flux was oxidized without catalyst using the previously described oxidation procedure and a product having a penetration of 18 and a softening point of 107° C. (224° F.) was obtained. This oxidized material meets shingle coating specifications.

EXAMPLE FOUR

This example demonstrates the impact both on properties and time to achieve those properties when a catalyst is and is not used to assist air oxidation. This example also illustrates how an objective of decreasing the time necessary to carry out an air oxidation by means of adding saturates having a significant amount of tertiary carbon atoms, e.g. at least about 5% by weight, and preferably at least about 10% by weight, as based upon the total weight of the saturate.

In the following table, there are:

An unacceptable flux which was air oxidized separately both with and without a catalyst;

That unacceptable flux, made acceptable with addition of slack wax in accordance with this invention, which was air oxidized separately both with and without a catalyst;

and finally

That unacceptable flux, made acceptable with petrolatum in accordance with this invention, which was air oxidized both with and without a catalyst.

tration range of about 0.1-1.0% by weight. Oxidation catalyst concentrations much above about 1.0 wt.% are undesirable because they are insoluble in trichloroethylene and may cause the finished roofing material to fail to pass solubility specifications. They also have a tendency to precipitate in storage tanks and cause coke in heaters.

This example also illustrates that the ratio formula requiring that (asphaltenes plus polars)/(saturates) be less than 2.4 can be avoided somewhat provided a sodium carbonate catalyst is used in conjunction with air-oxidation. In general, as illustrated in the only FIGURE, it has been found that a flux composition having components that satisfies a ratio of (asphaltenes plus polars)/(saturates) of less than or equal about 2.8 and has at least about 20% by weight of saturates, and more preferably at least 25% by weight of saturates as based upon the total weight of the flux, will yield a satisfactory roofing composition or satisfactory roofing flux. The only limitation on the concentration in percent by weight of saturates is that in the presence of at least about 10% asphaltenes a staple dispersion is achieved. Generally as the concentration of saturates increases the dispersion tends to be less and less stable.

TABLE FOR EXAMPLE 4

| Flux | Catalyst | Oxidation Time | Penetration | °C. (°F.) Softening Point | Meets Shingle Coating Specs. |
|---|---|---|---|---|---|
| Mixed Domestic | None | 18 hrs. | 18 | 81° C. (178° F.) | No |
| Mixed Domestic | 1.0 wt % Na$_2$CO$_3$ | 12 hrs. | 16 | 83° C. (181° F.) | No |
| 90 wt. % Mixed Domestic/10 wt. % Slack Wax | None | 24 hrs. | 17 | 106° C. (222° F.) | Yes |
| 90 wt. % Mixed Domestic/10 wt. % Slack Wax | 1.0 wt. % Na$_2$CO$_3$ | 18 hrs. | 18 | 115° C. (239° F.) | Yes |
| 90 wt. % Mixed Domestic/10 wt. % Petrolatum | None | 13 hrs. | 17 | 106° C. (223° F.) | Yes |
| 90 wt. % Mixed Domestic/10 wt. % Petrolatum | 1.0 wt. % Na$_2$CO$_3$ | 8.5 hrs. | 17 | 110° C. (230° F.) | Yes |

From the table it is clear that when petrolatum has been added, there was a significant increase in the rate at which the air oxidation without any catalyst was carried to completion.

Of still more importance there was suprisingly a synergistic impact from adding a saturated material having a significant amount of tertiary carbon atoms: There was a substantial increase in rate at which the air oxidation with catalyst was carried to completion.

This acceleration in rate can be troublesome if not carefully monitored and controlled. We have found that it is often desirable to have a slower initial rate of addition of the air to the flux followed by a faster rate after an initial exotherm has largely spent itself.

Reasons why it is sometimes undesirable to add an oxidation catalyst are that oxidation catalysts are sometimes corrosive and they are insoluble in organic solvents so they may cause the finished roofing material to fail to pass solubility specifications. Catalysts also have a tendency to precipitate in storage tanks and cause coke in heaters.

EXAMPLE FIVE

This example demonstrates if the additive is selected from slack waxes, then an alkaline earth carbonate as the oxidation catalyst is preferably added in a concen- The roofing flux from EXAMPLE TWO, which had an asphaltenes plus polars to saturates ratio of 5.45 and gave an unacceptable oxidized product, was blended with 10% slack wax. The resultant blend was analyzed by clay-gel and determined to have the following composition:

| | |
|---|---|
| Asphaltenes, wt. % - | 20.1 |
| Saturates, wt. % - | 20.5 |
| Polars, wt. % - | 37.4 |
| Aromatics, wt. % - | 22.0 |
| $\dfrac{\text{Asphaltenes + Polars}}{\text{Saturates}} = 2.80$ | |

The resultant blend was oxidized using the described oxidation without any catalyst and a product having a penetration of 15 and a softening point of 107° C. (225° F.) was obtained. This oxidized material fails to meet shingle coating specifications.

The above blended flux was then oxidized using the same oxidation procedure in the presence of 1.0 wt.% sodium carbonate. The sodium carbonate was introduced to the oxidizer in water solution. The finished oxidized product had a penetration of 19 and a softening point of 109° C. (229° F.). This oxidized material meets shingle coating specifications.

Generally, for economic reasons, it is preferable to make up for any deficiencies in additive by means of an oxidation catalyst.

EXAMPLE SIX

This example provides the details of an air oxidation employed both with and without oxidation catalysts. This example further shows how the catalyst is preferably incorporated or compounded into the flux composition. Preferably, compounding with an additive yields a satisfactory composition when only a minimal amount of the added solid precipitates out, e.g. less than about 0.5% by weight as based upon the total weight of the compounded composition.

Finally this example gives the details of test procedures used to determine the final properties of the air oxidized flux.

A roofing flux obtained from Middle Eastern crudes was analyzed by clay-gel and determined to have the following composition:

| | |
|---|---|
| Asphaltenes, wt. % - | 15.0 |
| Saturates, wt. % - | 21.0 |
| Polars, wt. % - | 40.0 |
| Aromatics, wt. % - | 24.0 |

$$\frac{\text{Asphaltenes + Polars}}{\text{Saturates}} = 2.62$$

The above roofing flux was oxidized using our standard procedure and a product having a penetration of 17 and a softening point of 104° C. (219° F.) was obtained. This oxidized material fails to meet shingle coating specifications.

The above roofing flux was oxidized in the presence of 1.0 wt.% sodium carbonate. The sodium carbonate was introduced to the oxidizer in water solution. The catalyst can be introduced a number of ways in a suspended or dissolved form as long as the catalyst is evenly dispersed throughout the flux. A particularly useful method to added the catalyst is to grind it to a small particle size and then add it as a suspension in a portion of the roofing flux. The sodium carbonate additive gave an oxidized product with a penetration of 21 and a softening point 107° C. (225° F.). This oxidized material meets shingle coating specifications.

To illustrate the effectiveness of sodium carbonate as an oxidation catalyst on a feedstock or charge derived from a Mid-Continent crude source, a vessel or oxidizer was charged with the feedstock. In one experiment no catalyst was used. The temperature in the vessel was raised to 177° C. (350° F.) and then air was introduced and dispersed into the vessel or oxidizer at a rate of 15 SCFH per ton of charge. When the temperature reached 254° C. (490° F.), water was sprayed on top of the molten charge or asphalt within the oxidizer to maintain a temperature of 254° to 260° C. (490° to 500° F.) for safety reasons. The temperature 254° to 260° C. (490° to 500° F.) was maintained until the oxidation was concluded as dictated by laboratory results on the oxidized charge which showed that the asphalt was within a desired specification range. In another experiment, an identical starting charge was oxidized in the same way except 0.8% by weight of sodium carbonate, based on weight of charge, was dissolved in water at 200° F. and introduced to the top of the oxidizer at the surface of the molten charge at the same time air was introduced into the bottom of the oxidizer. The only FIGURE of this Specification shows the results of the experiment and illustrates that at a given softening point the corresponding penetration is higher on the asphalt catlytically oxidized with sodium carbonate or the said catalytically oxidized charge is less susceptible to changes in temperature than the charge oxidized without a catalyst.

The oxidation curves obtained during the two above oxidations are shown in the FIGURE. The points enclosed by circles were obtained during the noncatalytic run and the points enclosed by triangles were obtained during the catalytic run with sodium carbonate. As can be seen the sodium carbonate oxidized run gave a product with a much improved penetration/softening point relationship. It is a trait of the sodium carbonate catalyst that the improvement in penetration and softening point is not seen till the end of the oxidation.

Specific compositions, methods, or embodiments discussed are intended to be only illustrative of the invention disclosed by this Specification. Variation on these compositions, methods, or embodiments are readily apparent to a person of skill in the art based upon the teachings of this Specification and are therefore intended to be included as part of the inventions disclosed herein.

Reference to patents made in the Specification is intended to result in such patents being expressly incorporated herein by reference, including any patents or other literature references cited within such patents.

The invention which is claimed is:

1. An improved process for air oxidizing an acceptable asphaltic roofing flux; wherein the improvement comprises compounding into said flux prior to air oxidizing a sufficient amount of a highly branched hydrocarbyl species to decresase the time to complete air oxidation.

2. The improved process of claim 1, wherein an air oxidation catalyst selected from the group consisting of a material containing carbonate or a sesquicarbonate is compounded into said flux in a percent by weight as based upon the total weight of said flux in the range of from about 0.1 to 1.0 prior to said air oxidation.

3. The improved process of claim 1, wherein said selected additive is a highly branched hydrocarbyl species having at least 10% by weight, as based upon the total weight of the hydrocarbyl species, of tertiary carbon atoms, i.e. carbon atoms having at least 3 carbon atoms attached to it which has sufficient boiling point and solubility so as not to volatilize away during air oxidizing and be soluble in the asphaltic roofing flux.

4. A process for air oxidizing without catalysts an acceptable asphaltic roofing flux, said process comprising compounding into said flux prior to air oxidizing a sufficient amount of material selected from the group consisting of petrolatums, a highly branched hydrocarbyl species, and mixtures thereof to decrease the time to complete air oxidation.

* * * * *